May 26, 1925.  1,539,223
E. WATERSTRAAT
PALM READING CHART
Filed Aug. 28, 1924
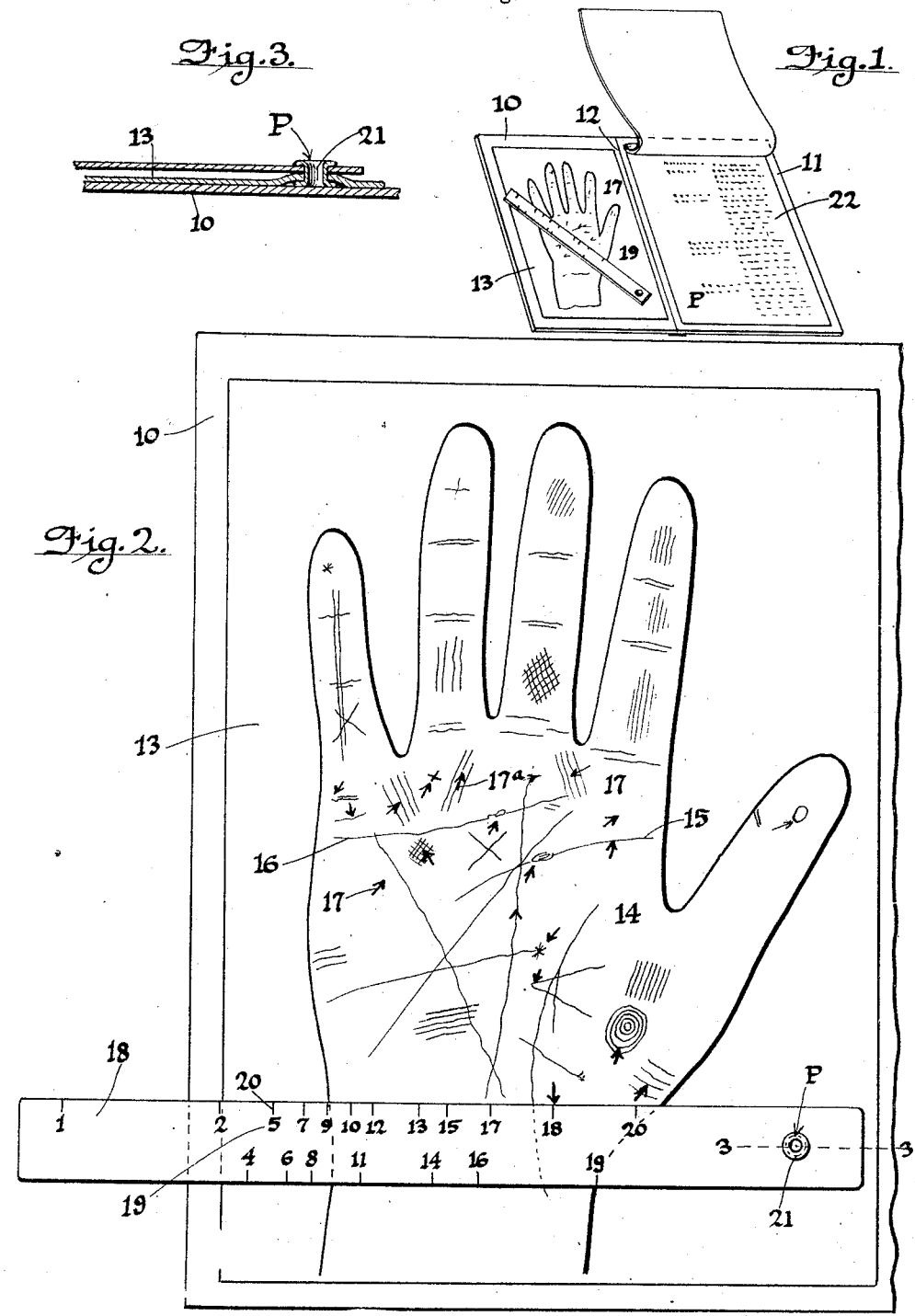

Patented May 26, 1925.

1,539,223

UNITED STATES PATENT OFFICE.

EMIL WATERSTRAAT, OF OCEAN PARK, CALIFORNIA.

PALM-READING CHART.

Application filed August 28, 1924. Serial No. 734,623.

*To all whom it may concern:*

Be it known that I, EMIL WATERSTRAAT, a citizen of the United States, residing at Ocean Park, in the county of Los Angeles and State of California, have invented new and useful Improvements in Palm-Reading Charts, of which the following is a specification.

This invention relates to improvements in palm reading charts.

It is an object of the invention to provide a device adapted to be used by amateurs in palmistry which will easily and quickly disclose the significance or meaning of lines or impressions upon the palm of the hand.

It is a further object of the invention to provide a chart illustrating the palm of a hand upon which certain location points are placed and to provide means associated with the chart adapted to selectively be brought into register with each of the location points in such a manner that the separate locations of impressions indicated upon the palm of the hand will not become confused.

With the foregoing and other objects in view which will be made manifest in the following detailed description and pointed out in the appended claims, reference is had to the accompanying drawings for an illustrative embodiment of the invention, wherein:

Figure 1 is a perspective view of the improved chart and table,

Fig. 2 is a top plan view of the improved chart upon an enlarged scale, and

Fig. 3 is a vertical section taken substantially on the line 3—3 of Fig. 2.

Referring to the accompanying drawings wherein similar reference characters designate similar parts throughout, the improved device consists of a pair of hinged leaves 10 and 11 preferably formed of cardboard and adapted to be folded one upon the other in book form upon a fold line 12.

Upon the leaf 10 is mounted a chart 13 which discloses a plan view of the palm of a hand as illustrated in Fig. 2. Upon the palm of the hand are illustrated "the life line" 14 "the head line" 15, and "the heart line" 16, and other lines or impressions adapted to be found upon the palm of a person's hand. The various lines and impressions which have a special significance with reference to a person's past or future life are indicated by location marks 17, which in the preferred form of the invention are small arrows. Each of the lines or impressions has its respective location mark located upon a separate radius from a point P located upon the chart. A guide strip 18 has indicia 19 thereon which has been illustrated in the form of numbers with marks 20 associated with each number. The guide strip 18 is pivoted to the chart 13 at the point P in any suitable manner and in the present form of the invention an eyelet 21 is employed. The guide strip 18 is adapted to be swung over the chart 13 about the point P as a center; and as the location marks 17 are all disposed upon separate radii from the point P, it is seen that each mark 17 will be registered with only one of the numbers carried by the guide strip 18. When it is desired to know the significance of an impression indicated, for instance, by the location mark 17$^a$, it is merely necessary to swing the guide strip 18 upwardly. This location mark 17$^a$ is adapted to register with only one number upon the guide strip 18 and as illustrated, this mark is adapted to register with the mark 20 opposite the number 7. To determine the significance of the impression indicated by the mark 17$^a$, it is merely necessary to refer to a table 22 which is mounted upon the leaf 11. The statement opposite the number 7 upon this table discloses the special significance attributed to the impression indicated by the location mark 17$^a$.

In this manner it is seen that an amateur desiring to ascertain the significance of certain lines or impressions upon his hand may compare the palm of his hand with the palm illustrated upon the chart, swing the guide strip 18 and determine the significance of any impression upon his hand.

It is to be understood that various changes in the detail of construction may be made without departing from the spirit or scope of the invention as defined by the appended claims.

I claim:

1. A device of the class described comprising a chart disclosing the palm of a hand, location marks upon said chart, a guide strip movable over said chart, said guide strip having indicia thereon adapted to be brought into register with said location marks, and a table associated with said chart adapted to disclose the significance of said location marks as registered by said guide strip.

2. A device of the class described comprising a chart disclosing the palm of a hand, location marks upon said chart, each of said marks being upon a separate radius from a common point upon said chart, a guide strip adapted to traverse said chart pivoted at said point, said guide strip bearing indicia adapted to be brought into register with said location marks, and a table associated with said chart for disclosing the significance of impressions indicated upon the hand as indicated by said location marks.

3. A device of the class described comprising a pair of hinged leaves, a chart disclosing the palm of a hand mounted upon one of said leaves, location marks upon said chart, each of said location marks being upon a separate radius from a common point upon said chart, a guide strip pivoted upon said common point adapted to traverse said chart, indicia upon said guide strip adapted to register with each of said location marks, and a table mounted upon the other of said leaves for disclosing the significance of the impressions upon said hand as indicated by said location marks.

In testimony whereof I have signed my name to this specification.

E. WATERSTRAAT.